United States Patent [19]

Sakamoto et al.

[11] Patent Number: 5,270,845
[45] Date of Patent: Dec. 14, 1993

[54] LIQUID CRYSTAL DISPLAY UNIT MANUFACTURING METHOD INCLUDING FORMING ONE OF TWO GATE LINE LAYERS OF DISPLAY ELECTRODE MATERIAL

[75] Inventors: Hirokazu Sakamoto; Masayuki Yokomizo; Masahiro Hayama; Takao Matsumoto; Naoki Nakagawa; Makoto Ohtani, all of Hyogo, Japan

[73] Assignee: Mitsubishi Denki K.K., Tokyo, Japan

[21] Appl. No.: 987,591

[22] Filed: Dec. 18, 1989

Related U.S. Application Data

[63] Continuation of Ser. No. 157,664, Feb. 19, 1988, abandoned.

[30] Foreign Application Priority Data

Feb. 19, 1987 [JP] Japan .................................... 62-37259

[51] Int. Cl.⁵ .................................................. G02F 1/1343
[52] U.S. Cl. .................................... 359/59; 359/54; 359/87
[58] Field of Search ............... 350/333, 334, 336; 359/59, 54, 87

[56] References Cited

U.S. PATENT DOCUMENTS

| | | | |
|---|---|---|---|
| 4,804,953 | 2/1989 | Castleberry | 359/59 |
| 4,990,460 | 2/1991 | Moriyama | 359/59 |
| 5,032,531 | 7/1991 | Tsutsui et al. | 359/59 |
| 5,107,355 | 4/1992 | Satoh et al. | 359/87 |
| 5,153,754 | 10/1992 | Whatten | 359/59 |

FOREIGN PATENT DOCUMENTS 58-83815  5/1983  Japan .................................... 350/336
56-181147 5/1983  Japan .

OTHER PUBLICATIONS

T. Sunata et al "A Large-Area High-Resolution Active-Matrix Color LCD".

Primary Examiner—William L. Sikes
Assistant Examiner—Anita Pellman Gross
Attorney, Agent, or Firm—Sughrue, Mion, Zinn Macpeak & Seas

[57] ABSTRACT

An improved method for manufacturing a liquid crystal display unit substantially free from gate electrode breakage but with no increase in the number of manufacturing steps over the conventional method. The liquid crystal display unit includes a TFT array substrate including a plurality of gate electrode lines juxtaposed on a transparent insulating substrate, a plurality of source electrode lines arranged across the gate electrode lines, nonlinear active elements disposed at the intersections of the electrode lines, a confronting electrode substrate having a transparent conductive film on the surface thereof confronting the TFT array substrate, and a liquid crystal display material being held between the confronting electrode substrate and the TFT array substrate. Each of the gate electrode lines is constructed in the form of two layers. One of the two layers is made of display electrode material simultaneously with the formation of the display electrode.

3 Claims, 2 Drawing Sheets

LIQUID CRYSTAL DISPLAY UNIT MANUFACTURING METHOD INCLUDING FORMING ONE OF TWO GATE LINE LAYERS OF DISPLAY ELECTRODE MATERIAL

This is a continuation of U.S. patent application Ser. No. 07/157,664 filed Feb. 19, 1988, now abandoned.

BACKGROUND OF THE INVENTION

The present invention relates to a method of manufacturing liquid crystal display units. More particularly, the invention relates to a method for manufacturing a liquid crystal display unit in which the probability of, in the manufacture of a large-area high-resolution liquid crystal display unit, the gate electrode lines being broken is reduced.

In a liquid crystal display unit, in general, a display material such as liquid crystal is held between two substrates. A voltage is applied to the display material to effect the desired display. To this end, picture element electrodes are arranged in matrix form on at least one of the two substrates, and active elements such as FETs (field-effect transistors) having a nonlinear characteristic are provided for the respective picture element electrodes with which the picture element electrodes are selectively activated.

A conventional liquid crystal display unit of this type is shown in FIGS. 1, 2 and 3. FIG. 1 is a plan view showing essential components of a TFT array substrate formed according to a conventional liquid crystal display unit manufacturing method. FIGS. 2 and 3 are sectional views taken along lines II—II and III—III, respectively, in FIG. 1.

In these figures, reference numeral 1 designates a transparent insulated substrate; 2, a gate electrode line used to form gate electrodes; 3, a source electrode line used to form source electrodes; 4, a drain electrode; 5, a display electrode such as a picture element electrode; 6, a gate insulating film; 7, a semiconductor layer; 8, a passivation film; 9, a light shielding film; and 10, a contact part between the drain electrode 4 and the picture element electrode 5. In this unit, a plurality of gate electrode lines 2 and a plurality of source electrode lines 3 are arranged in such a manner that the source electrode lines 3 cross the gate electrode lines 2. At each of the intersections of the lines 2 and 3, the drain electrode 4, the gate insulating film 6, the semiconductor layer 7, the gate electrode 2 and the source electrode 3 form a nonlinear type active element. The active elements and the picture element electrodes 5 form the TFT array substrate.

The TFT array substrate confronts an electrode substrate (not shown) with liquid crystal or the like held therebetween, thus forming a liquid crystal display unit. A transparent conductive film is formed on the confronting electrode substrate.

The gate electrodes 2 of the TFT array substrate employed, for instance, in a liquid crystal display unit is, in general, made of a high-melting-point metal such as Cr for the purpose of preventing picture element defects due to the occurrence of cracks. The high melting-point metal has a high resistivity, and therefore the film thickness is of the order of 2000 Å at the maximum. However, in the formation of a large-screen high-resolution display unit, the film thickness should be of the order of 3000 Å to prevent the signals from being attenuated by the circuit resistance and to allow high frequency operations.

In the conventional liquid crystal display described above, if the thickness of the gate electrode lines is increased to about 3000 Å, the probability of cracks forming is increased. Moreover, in order to increase the resolution, the wiring should be made finer. However, if in the manufacture of liquid crystal display units the patterning is unsatisfactory due to the presence of dust or the like, the wires have a greater tendency to break, thus lowering the yield.

SUMMARY OF THE INVENTION

Accordingly, an object of the present invention is to eliminate the above described difficulties accompanying a conventional liquid crystal display unit manufacturing method. More specifically, an object of the invention is to provide a liquid crystal display unit manufacturing method not requiring an increased number of manufacturing steps but with which a liquid crystal display unit substantially free from breakage of the gate electrode lines is obtained.

The foregoing object of the invention has been achieved by the provision of a method for manufacturing a liquid crystal display unit having a TFT array substrate including a plurality of gate electrode lines juxtaposed on a transparent insulating substrate, a plurality of source electrode lines arranged across the gate electrode lines, and nonlinear type active elements and display electrodes provided at the intersections of the electrode lines; a confronting electrode substrate having a transparent conductive film on the surface thereof and confronting the TFT array substrate; and a liquid crystal display material held between the confronting electrode substrate and the TFT array substrate, in which, according to the invention, each of the gate electrode lines is made in the form of two layers, and one of the two layers is made of display electrode material simultaneously with the formation of the display electrode.

In the method of the invention, each of the gate electrode lines is in the form of two layers, one of which is made of the display electrode material simultaneously with the formation of the display electrode. As a result, the number of manufacturing steps is equal to that in the conventional method. Moreover, even if one of the two layers contains a patterning defect due to the occurrence of cracks or the presence of dust, the other remains effective.

DESCRIPTION OF THE PREFERRED EMBODIMENTS

Figure 4:
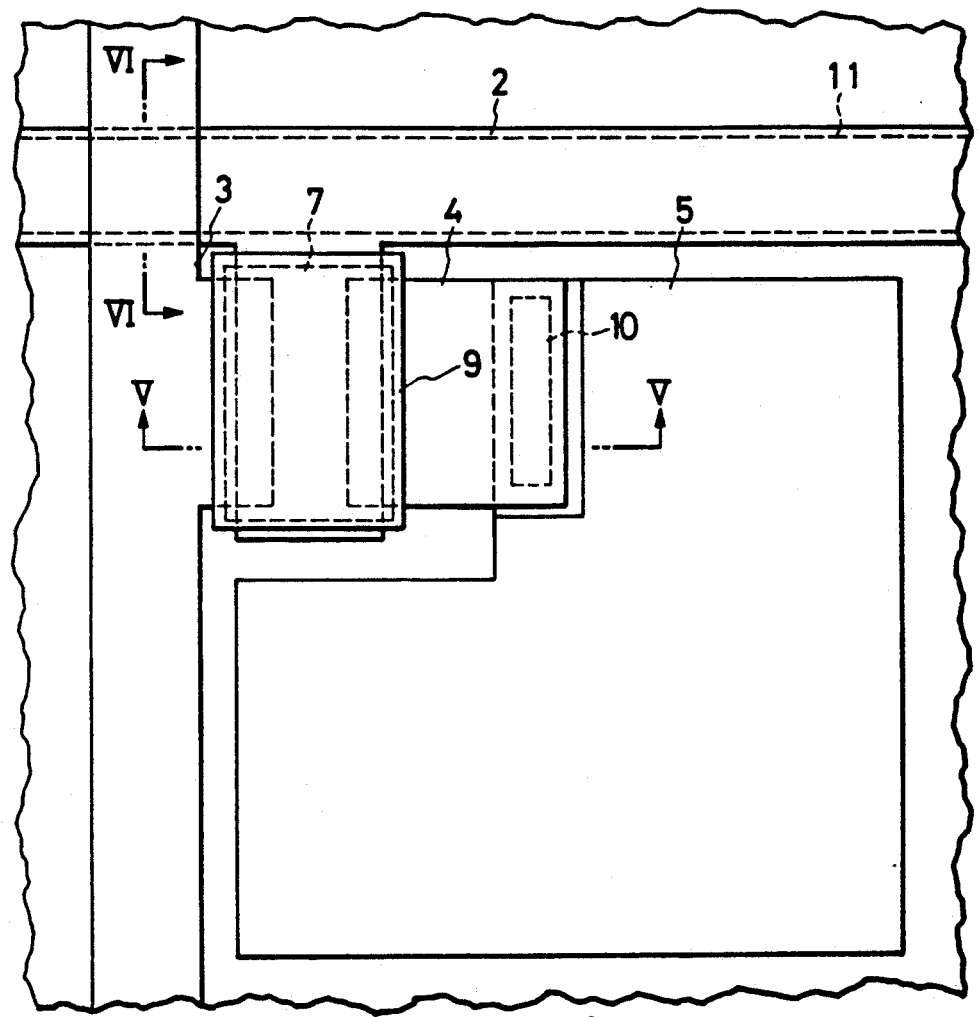
FIG. 4 is a plan view showing essential components of a TFT array substrate in a liquid crystal display unit manufactured according to an example of a liquid crystal display unit manufacturing method according to the invention.
Figure 5:
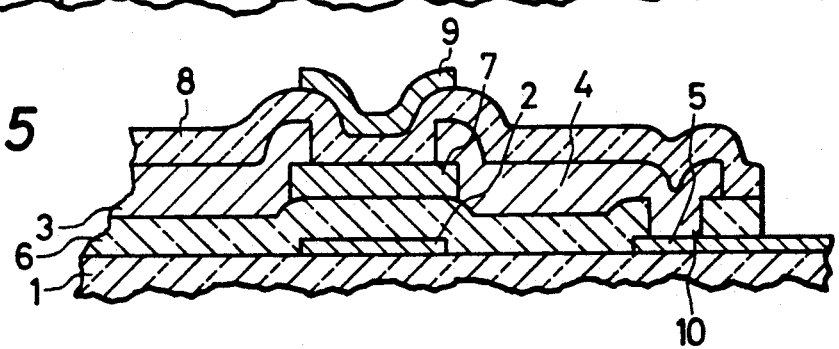
FIGS. 5 and 6 are sectional views taken along lines V—V and VI—VI in FIG. 4, respectively.
Figure 6:
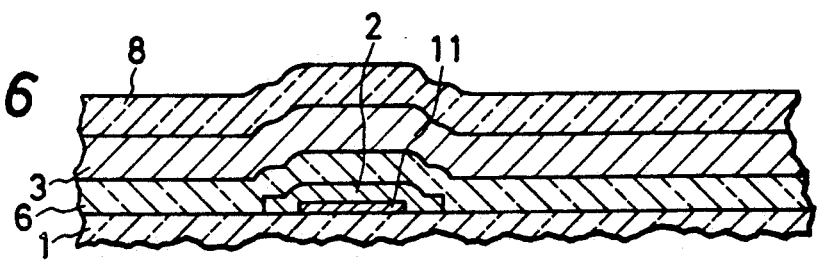

FIG. 4 is a plan view showing essential components of a TFT array substrate in a liquid crystal display unit formed according to an example of a liquid crystal display unit manufacturing method according to the invention. FIG. 5 is a sectional view taken along a line V—V in FIG. 4. FIG. 6 is a sectional view taken along a line VI—VI in FIG. 4.

Figure 1:
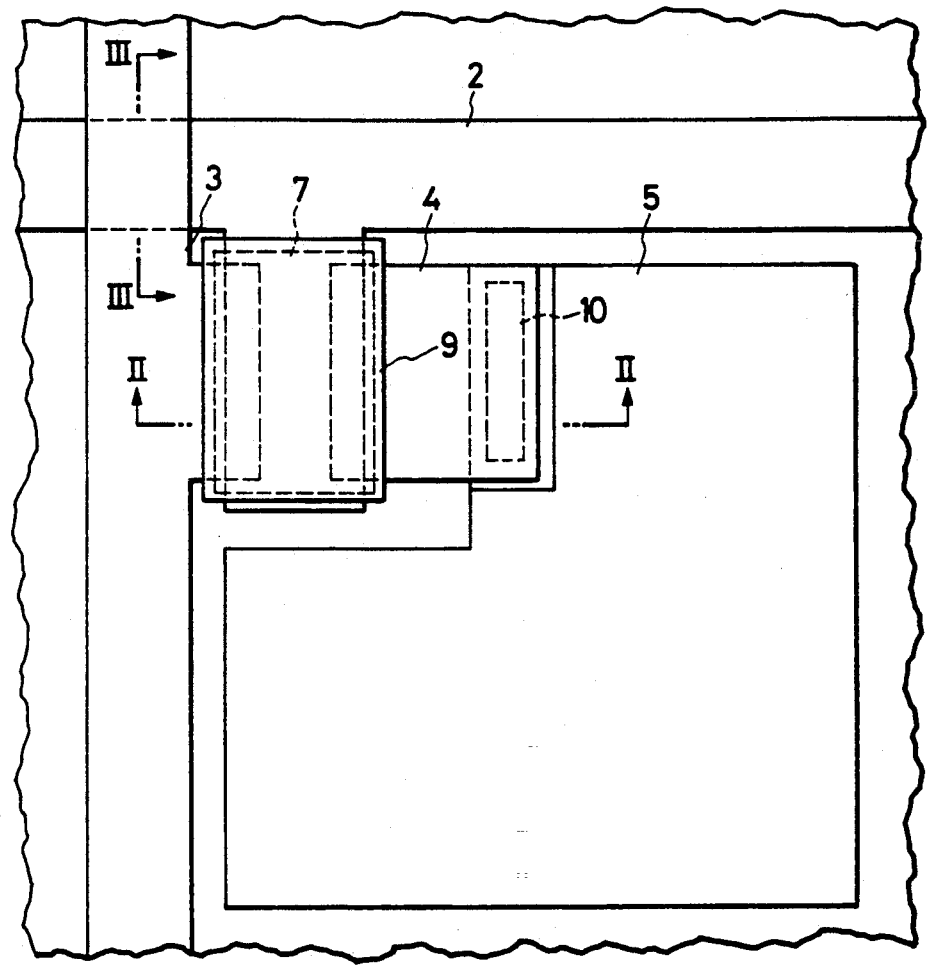
FIG. 1 is a plan view showing essential components of a TFT array substrate in liquid crystal display unit manufactured according to a conventional liquid crystal display unit manufacturing method.
Figure 2:
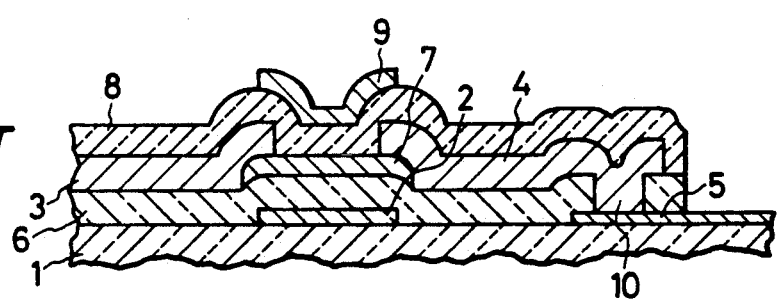
FIGS. 2 and 3 are sectional views taken along lines II—II and III—III in FIG. 1, respectively.
Figure 3:
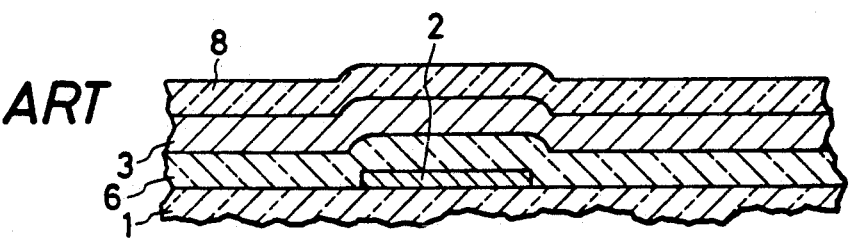

In FIGS. 4 through 6, parts corresponding functionally to those which have been already described with reference to FIGS. 1 through 3 are designated by the same reference numerals. In FIGS. 4 through 6, reference numeral 11 designates a first gate conductor formed of display electrode material simultaneously with the formation, for instance, of the picture element electrode 5, and reference numeral 2 indicates a gate electrode line used as gate electrodes similarly to the conventional case, namely, a second gate electrode line.

A method of manufacturing the TFT array substrate of the liquid crystal display unit according to the invention will now be more concretely described.

A transparent conductive film of ITO (indium tin oxide) or the like is formed on a transparent insulating substrate 1 such as a glass plate by EB vacuum deposition. Thereafter, the picture element electrode 5 and the linear first gate electrode line 11 are simultaneously formed on the transparent conductive film, for instance, by photolithography, and a metal layer of Cr or the like is formed thereon, for instance, by EB vacuum deposition. Then, the second gate electrode line 2 is formed over the first gate electrode line 11 of ITO, for instance, by photolithography.

Next, $Si_3N_4$ or $SiO_2$ is deposited using a CVD method or the like to form the gate insulating film 6, and then a-Si:H is deposited by the same method to form the semiconductor layer 7. In succession, the semiconductor layer 7 is shaped like an island, and the contact part 10 for connecting the picture element electrode 5 to the drain electrode 4 is formed in the gate insulating film 6. Next, a metal such as Al or the like is deposited to form the source electrode line 3 which is used as source electrodes, and the drain electrode 4. Under this condition, $Si_3N_4$ or $SiO_2$ is deposited to form the passivation film 8. Thereafter, the gate insulating film 6 and the passivation film 8 are removed from the picture element electrode 5 simultaneously.

Next, Al or the like is deposited to form the light shielding film 9. Display material such as liquid crystal is filled between the TFT array substrate thus formed and the confronting electrode substrate having the transparent conductive electrodes and color filters to form a liquid crystal display device.

In the liquid crystal display device thus constructed, the gate electrode lines 2 and 11 are in the form of two layers which are patterned individually. Therefore, even if one of the layers contains a patterning defect due to the occurrence of cracks or the presence of dust, the other layer is satisfactory; that is, no breakage of wires occurs. That is, the probability of the two layers containing patterning defects at the same position is considerably low. Moreover, the total film thickness of the electrode lines 2 and 11 defined by the two layers is relatively large. However, because the layers are formed on one another, the amount of unevenness is substantially equal to that of a conventional liquid crystal display unit. Therefore, in the display unit of the invention, the source electrode line 3 is satisfactory in coverage at all times, and a reduction of resistance is thus attained.

Furthermore, since one of the gate electrodes lines 2 and 11 is formed simultaneously with the formation of the picture element electrode 5, the number of manufacturing steps is completely the same as that of the conventional liquid crystal display unit. Accordingly, with the method of the invention, a liquid crystal display unit having a large area, high resolution and fewer number of display defects can be manufactured with a high yield.

In the above-described embodiment, the second gate electrode line 2, which is the conductive layer, is formed on the first gate electrode line 11, which is made of the display electrode material. The same effect though can be obtained by employing a method in which the layer 11 of the display electrode material is formed on the conductive layer 2.

In the above-described embodiment, ITO (indium tin oxide) is employed as the display electrode material of one of the two layers forming the gate electrode lines; however, the invention is not limited thereto or thereby. That is, for instance, tin oxide may be employed as the display electrode material.

Furthermore, in the above-described embodiment, Cr is employed as the material of the conductive layer of the other of the two layers forming the gate electrode lines; however, the invention is not limited thereto or thereby. That is, Ti, Ta of Cr-Ni may be employed as the material of the conductive layer.

In addition, in the above-described embodiment, the gate electrode lines are in the form of two laminated layers. However, the same effect can be obtained by employing a method in which two layers are juxtaposed.

As is apparent from the above description, according to the invention, in a liquid crystal display unit having a TFT array substrate including a plurality of gate electrode lines juxtaposed on the transparent insulating substrate, a plurality of source electrode lines arranged crossing the gate electrode lines, and nonlinear type active elements and display electrodes disposed at the intersections of the electrodes lines, the confronting electrode substrate having a transparent conductive film on its surface and confronting the TFT array substrate, and liquid crystal material being held between the confronting electrode substrate and the TFT array substrate, each of the gate electrode lines is in the form of two layers, one of which is made of display electrode material simultaneously with the formation of the display electrodes. Accordingly the liquid crystal display unit manufacturing method of the invention does not require an increased number of manufacturing steps, and the probability of the gate electrode lines being broken is reduced.

We claim:

1. In a method for manufacturing a liquid crystal display unit comprising: a TFT array substrate including a plurality of gate electrode lines juxtaposed on a transparent insulating substrate, a plurality of source electrode lines arranged across said gate electrode lines, and nonlinear active elements and display electrodes provided at the intersections of said electrode lines; a confronting electrode substrate having a transparent conductive film on the surface thereof and confronting said TFT array substrate; and a liquid crystal display material held between said confronting electrode substrate and said TFT array substrate, the improvement wherein each of said gate electrode lines is made in the form of two layers, each comprising a different material and one of said two layers being made of display electrode material simultaneously with the formation of said display electrode.

2. The method as claimed in claim 1, wherein each of said gate electrode lines comprises: a layer of display electrode material; and a conductive layer of a differential material laminated on said layer of display electrode material.

3. The method as claimed in claim 1, wherein each of said gate electrode lines comprises: a conductive layer of one material; and a layer of display of electrode material, different from said one material, laminated on said conductive layer.

* * * * *